(12) United States Patent
Chang et al.

(10) Patent No.: US 7,218,673 B2
(45) Date of Patent: May 15, 2007

(54) CHANNEL EQUALIZER OF SINGLE CARRIER RECEIVER AND EQUALIZING METHOD THEREOF

(75) Inventors: Yong-deok Chang, Suwon (KR); Jae-Hyon Kim, Suwon (KR); Jin-hee Jeong, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 739 days.

(21) Appl. No.: 10/625,614

(22) Filed: Jul. 24, 2003

(65) Prior Publication Data

US 2004/0146100 A1    Jul. 29, 2004

(30) Foreign Application Priority Data

Sep. 19, 2002    (KR) .................. 10-2002-0057399

(51) Int. Cl.
  *H03K 5/159*    (2006.01)
  *H04L 23/02*    (2006.01)
  *H04B 1/10*     (2006.01)

(52) U.S. Cl. .............. 375/233; 375/265; 375/350

(58) Field of Classification Search ......... 375/233, 375/350, 265; 348/614, 726
See application file for complete search history.

(56) References Cited

U.S. PATENT DOCUMENTS 5,872,817 A    2/1999    Wei 6,222,592 B1 *  4/2001  Patel ............... 348/614
6,313,882 B1 * 11/2001  Limberg et al. ..... 348/614
6,816,548 B1 * 11/2004  Shiue et al. ....... 375/233
2003/0001974 A1 *  1/2003  DSouza ........... 348/614

OTHER PUBLICATIONS

Chinese Office Action dated Jul. 22, 2005 for corresponding Chinese Patent Application No. 031566553.

* cited by examiner

*Primary Examiner*—Don N. Vo
(74) *Attorney, Agent, or Firm*—Staas & Halsey LLP

(57) ABSTRACT

A channel equalizer of a single carrier receiver of improved equalization efficiency includes a feed-forward filter that removes a pre-ghost from respective symbols of a broadcasting signal, a feedback filter that removes a post-ghost from the respective symbols of the broadcasting signal, an adder that adds the pre-ghost removed symbols with the post-ghost removed symbols, a level decision unit that determines a level of the symbols added at the adder with reference to predetermined level data and then feeds back the determined level to the feedback filter, a trellis decoder that performs trellis decoding with respect to the symbols added at the adder and has a whole decoding depth as N (N=natural number), and a whole length of a trace back delay as N×K (K=natural number), an error calculator that calculates an error value between the symbols added at the adder and the level determined at the level decision unit, and a trellis control unit that controls the trellis decoder so that a plurality of decoded symbols output from the trellis decoder can be input to the feedback filter in correspondence to the error obtained at the error calculator.

31 Claims, 6 Drawing Sheets

| TAP(DEPTH) (SYMBOL) OUTPUT SNR (dB) | 0 | 24 | 48 | 72 | 96 | 120 |
|---|---|---|---|---|---|---|
| BRAZILIAN D CHANNEL | 17.8 | 16.9 | 15.0 | 14.4 | 14.1 | 13.9 |

CHANNEL EQUALIZER OF SINGLE CARRIER RECEIVER AND EQUALIZING METHOD THEREOF

CROSS-REFERENCE TO RELATED APPLICATION

This application claims the benefit of Korean Application No. 2002-57399, filed Sep. 19, 2002, in the Korean Intellectual Property Office, the disclosure of which is incorporated herein by reference.

BACKGROUND OF THE INVENTION

1. Field of the Invention

The present invention relates to a channel equalizer of a single carrier receiver, and more particularly, to a channel equalizer of a single carrier receiver that performs equalization of a received signal with respect to channel environments using a plurality of decoded symbols provided by a trellis decoder, and a channel equalizing method thereof.

2. Description of the Related Art

As for a transmission scheme for digital broadcasting signals, there are mainly a vestigial sideband (VSB) modulation scheme and a coded orthogonal frequency division multiplexing (COFDM) modulation scheme. The VSB modulation scheme transmits broadcasting signals with a single carrier. The COFDM modulation scheme multiplexes and transmits the broadcasting signal through multiple transmission channels. The VSB modulation scheme is a US-oriented digital broadcasting transmission scheme that has been adopted in various countries including South Korea and U.S.A., while the CDFDM modulation scheme is a European-oriented digital broadcasting transmission scheme.

A current standard adopted for the VSB modulation of a US-oriented terrestrial wave digital television is an ATSC-8VSB that converts the broadcasting signal to be transmitted into 8 levels. Meanwhile, a VSB receiver receives the broadcasting signal that has been modulated by the VSB modulation. The VSB receiver is provided with a channel equalizer that equalizes distortions occurring in transmission channels.

FIG. 1 is a view showing a channel equalizer adapted for use in a conventional single carrier receiver by way of an example. The channel equalizer of the single carrier receiver includes a feed-forward filter 10, a feedback filter 30, an adder 40 and a slicer 50. The channel equalizer having the feed-forward filter 10 and the feedback filter 30 is called a decision feedback equalizer (DFE).

The feed-forward filter 10 removes a pre-ghost influence from respective symbols of the broadcasting signal. The feedback filter 30 removes a post-ghost influence from the respective symbols of the broadcasting signal. The adder 40 adds a remnant value obtained from the feed-forward filter 10 after the pre-ghost removal, with another remnant value obtained from the feedback filter 30 after the post-ghost removal.

The slicer 50 determines a level of a signal obtained from the adder 40 to be a nearest one among predetermined levels. The slicer 50 feeds back the determined signal level to the feedback filter 30.

The feed-forward filter 10 includes a buffering unit 12, a multiplier 14, and a second adder 16. The buffering unit 12 stores and buffers broadcasting signals in respective buffers $Z^{-1}$ in an inputting order and in a symbol unit. The multiplier 14 multiplies the respective symbols that are stored and buffered in the buffers $Z^{-1}$ of the buffering unit 12 by a feed-forward filter tap coefficient of an equalizer (not shown), thereby removing the pre-ghost from the broadcasting signals. The second adder 16 adds up values obtained from the multiplier 14 after the removal of the pre-ghost from the broadcasting signals.

The feedback filter 30 includes a buffering unit 32, a multiplier 34 and a third adder 36. The buffering unit 32 stores and buffers level data determined at the slicer 50 consecutively in the inputting order and in the symbol unit. The multiplier 34 removes the post-ghost from the respective symbols that are stored and buffered in the respective buffers $Z^{-1}$ of the buffering unit 32. The adder 36 adds up the values obtained after the removal of the post-ghost from the broadcasting signals.

With the channel equalizer of FIG. 1, the determined level data are input by the slicer 50 as an input of the feedback filter 30. If an error occurs in the slicer 50 in determining the level data, the error level data is passed through the feedback filter 30 and added to an output value from the feed-forward filter 10 at the adder 40.

Meanwhile, the slicer 50 usually has a different performance in determining the level data according to the number of levels set for the broadcasting signal. For example, with respect to the same electric value of the broadcasting signal, an 8-VSB modulation having 8 levels has a gap between the signal levels as half as a 4-VSB modulation having 4 levels. Accordingly, the possibility that the slicer 50 may have an erroneous level data determination increases.

As the error of the slicer 50 increases, an error propagation occurs at the feedback filter 30. Furthermore, a signal to noise ratio (SNR) greatly decreases in accordance with the error of the slicer 50, thereby degrading performance of the channel equalizer and as a whole, degrading the receptivity of the single carrier receiver.

In order to avoid performance deterioration of the channel equalizer due to the erroneous level data determination by the slicer 50, a trellis coded modulation (TCM) may be adapted to perform trellis coding with respect to the signals being input to the channel equalizer.

FIG. 2 is a view showing another channel equalizer adapted for use in the conventional single carrier receiver, i.e., the conventional VSB receiver. As shown in FIG. 2, the channel equalizer includes the feed-forward filter 10, the feedback filter 30, the adder 40, the slicer 50, a computation unit 60 and a trellis coded modulation (TCM) unit 70.

The feed-forward filter 10 removes an influence by the pre-ghost with respect to the respective symbols of the broadcasting signal. The feedback filter 30 removes the post-ghost with respect to the respective symbols of the broadcasting signal. The adder 40 adds the remnant value obtained at the feed-forward filter 10 after pre-ghost removal, to the another remnant value obtained at the feedback filter 30 after post-ghost removal. The slicer 50 decides the level of the signal obtained at the adder 40 to be the nearest one among the predetermined levels.

The computation unit 60 calculates a difference between output values from the adder 40 and the slicer 50. The TCM unit 70 performs trellis decoding with respect to the output value of the adder 40. The TCM unit 70 feeds back a resultant value of the trellis decoding to the feedback filter 30. Accordingly, the feedback filter 30, based on trellis decoded data fed back from the TCM unit 70, removes the post-ghost from the respective symbols of the broadcasting signal.

The trellis-decoded data is, due to a feedback delay caused by the trellis decoding, input to the feedback filter 30 during a predetermined time period in which the feedback filter 30 removes the post-ghost from the respective symbols based on the output value from the slicer 50. Accordingly, the feedback filter 30 has to remove the post-ghost from the respective symbols based on the level data determined at the slicer 50 until the trellis decoded data is input from the TCM unit 70, and this causes the slicer 50 to erroneously determine the level data.

Furthermore, under a channel environment where ghost which is robust to the broadcasting signal exists prior to an output delay of the TCM unit 70, a high equalization performance cannot be guaranteed even from the channel equalizer having the TCM unit 70 employed therein.

SUMMARY OF THE INVENTION

Accordingly, it is an aspect of the present invention to provide a channel equalizer of a vestigial sideband (VSB) equalizer that uses trellis decoding for ghost removal, which is capable of improving an equalization performance even under a channel environment where a ghost which is robust to the broadcasting signal exists before a signal output delay is caused by the trellis decoding, and a channel equalizing method thereof.

Additional aspects and advantages of the invention will be set forth in part in the description which follows and, in part, will be obvious from the description, or may be learned by practice of the invention.

To achieve the above and/or other aspects of the present invention, a channel equalizer of a single carrier receiver of an improved equalization efficiency includes a feed-forward filter that removes a pre-ghost from respective symbols of a broadcasting signal, a feedback filter that removes a post-ghost from respective symbols of the broadcasting signal, an adder that adds the pre-ghost removed symbols to the post-ghost removed symbols, a level decision unit that determines a level of the symbols added at the adder with reference to predetermined level data and then feeds back the determined level to the feedback filter, a trellis decoder that performs trellis decoding with respect to the symbols added at the adder and has a whole decoding depth as an N (N=natural number), and a whole length of a trace back delay as an N×K (K=natural number), an error calculator that calculates an error value between the symbols added at the adder and the determined level of the level decision unit, and a trellis control unit that controls the trellis decoder so that a plurality of decoded symbols output from the trellis decoder can be input to the feedback filter in accordance with the error obtained at the error calculator.

The trellis control unit controls the trellis decoder so that the decoded symbols are input to the feedback filter when a signal to noise ratio (SNR) corresponding to the error value is equal to or more than a predetermined threshold.

The decoded symbols output from decoding depth states of n (n≦N, N=natural number) are input to a 1+(n×K)th filter tap of the feedback filter. Accordingly, the decoded symbols output from the decoding depth states are input to respectively corresponding filter taps of the feedback filter.

With an input of the determined level from the level decision unit, the feedback filter removes the post-ghost with respect to the respective symbols based on the determined level, and with another input of the decoded symbols from the trellis decoder, the feedback filter removes the post-ghost based on the decoded symbols.

Meanwhile, to achieve the above and/or other aspects of the present invention, a channel equalizing method of a single carrier receiver includes removing a pre-ghost with respect to respective symbols of an input signal with a feed-forward filter, removing a post-ghost with respect to respective symbols of the input signal with a feedback filter, combining the pre-ghost removed symbols with the post-ghost removed symbols, performing a feedback operation of deciding a sum of the symbols as a corresponding level with reference to predetermined level data to input a determined level to the feedback filter, computing an error between the sum of the symbols and the determined level based on a predetermined error updated algorithm, performing a trellis decoding operation of performing trellis decoding with a trellis decoder, and performing a controlling operation of controlling whether to input a plurality of decoded symbols output from the trellis decoder to the feedback filter based on the computed error.

The controlling operation inputs the decoded symbols from the trellis decoder into the feedback filter when a signal to noise ratio (SNR) corresponding to the error value is equal to or more than a predetermined threshold.

The decoded symbols output from decoding depth states of n (n≦N, N=natural number) are input to a 1+(n×K)th filter tap of the feedback filter. Accordingly, the decoded symbols output from the decoding depth states are input to respectively corresponding filter taps of the feedback filter.

The feedback filter removes the post-ghost from the respective symbols based on the determined level, and with the input of the decoded symbols from the trellis decoder, removes the post-ghost from the respective symbols based on the decoded symbols.

As a result, even when the SNR corresponding to the error value obtained at the error calculator is equal to or more than the predetermined threshold, degradation of an equalization efficiency due to an erroneous level decision of the level decision unit is prevented by the feedback filter which performs filtering based on the decoded data input from the trellis decoder.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
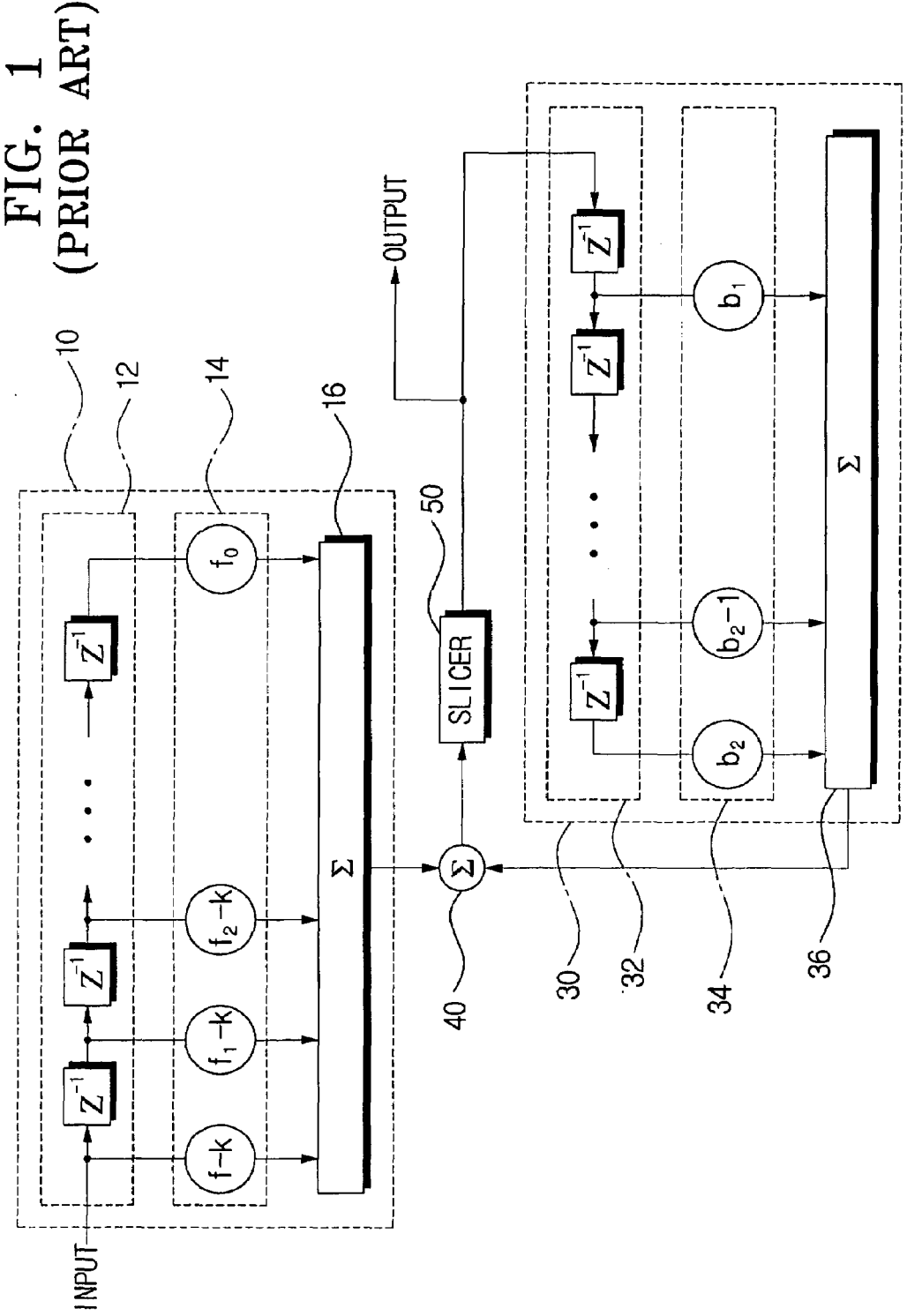
FIG. 1 is a view showing a channel equalizer adapted for use in a conventional single carrier receiver.
Figure 2:
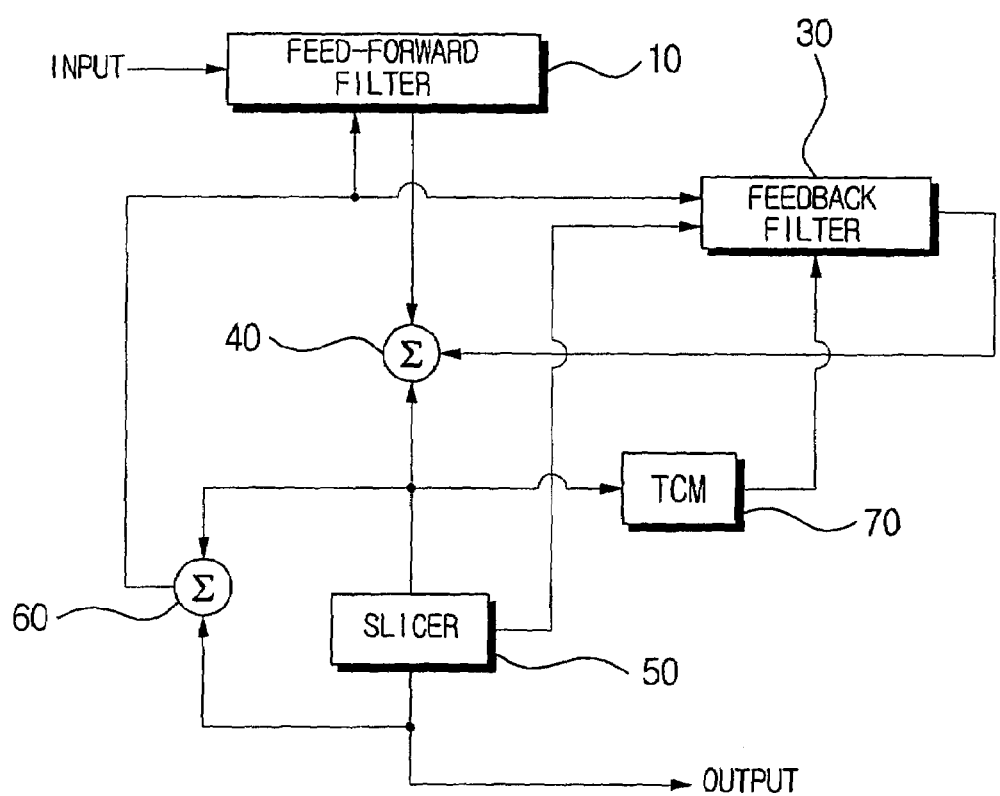
FIG. 2 is a view showing another channel equalizer adapted for use in the conventional single carrier receiver.

Reference will now be made in detail to the present preferred embodiment of the present invention, examples of which are illustrated in the accompanying drawings, wherein like reference numerals refer to the like elements throughout. The embodiment is described below in order to explain the present invention by referring to the figures.

Hereinafter, the present invention will be described in detail with reference to the accompanying drawings.

Figure 3:
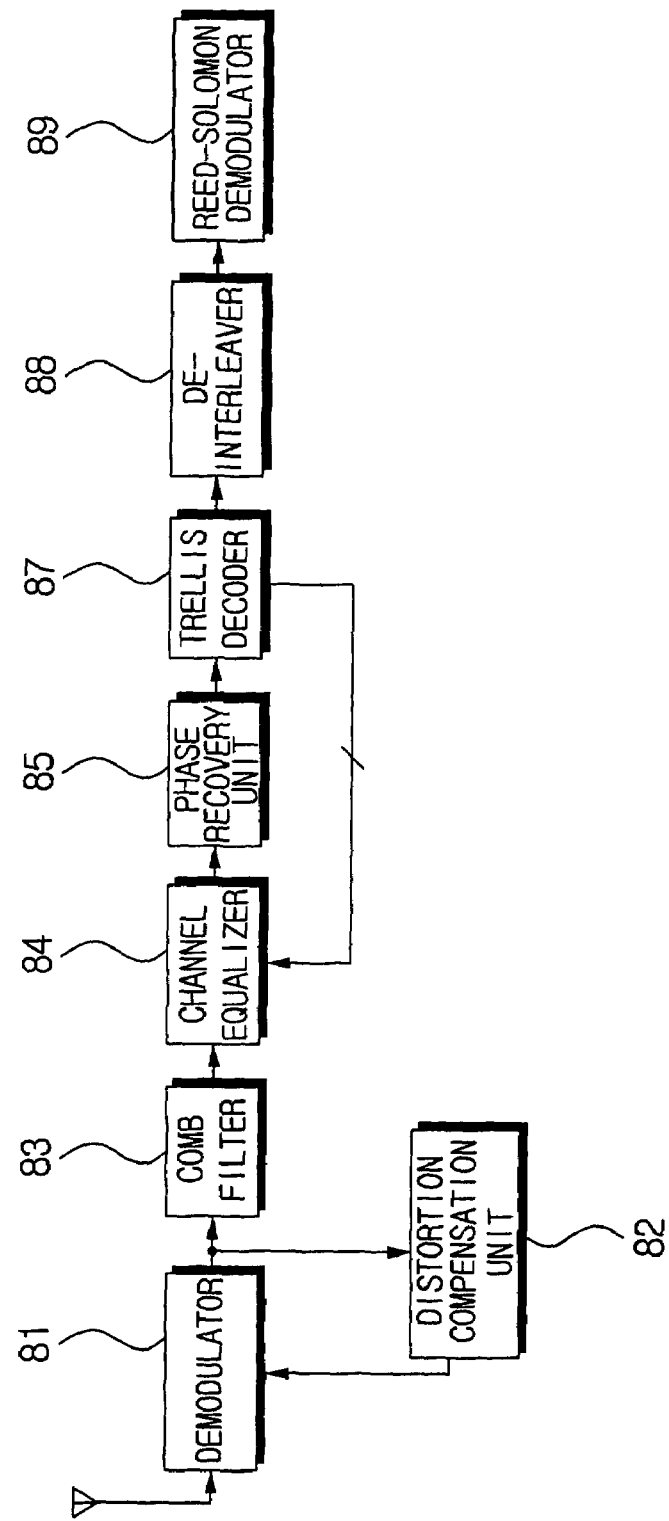
FIG. 3 is a schematic block diagram of a single carrier receiver according to an embodiment of the present invention.

A structure of a VSB receiver, one of single carrier receivers, will be explained with reference to FIG. 3 showing a schematic block diagram of the VSB receiver according to an embodiment of the invention. The VSB receiver is described hereinafter as an example of the single carrier receivers. However, the invention is not limited thereto.

As shown in FIG. 3, the VSB receiver includes a demodulator 81, a distortion compensator 82, a comb filter 83, a channel equalizer 84, a phase recovery unit 85, a trellis decoder 87, a de-interleaver 88 and a reed-solomon demodulator 89.

The demodulator 81 converts a received broadcasting signal from an RF bandwidth into a base bandwidth. The distortion compensator 82 recovers a segment synchronization signal, a field synchronization signal and a symbol timing signal with respect to the broadcasting signal output from the demodulator 81. The comb filter 83 removes an NTSC (National television system committee) interference signal from the broadcasting signal output from the demodulator 81.

The channel equalizer 84 compensates for channel distortion that occurs during transmission of the broadcasting signal through a transmission channel. The phase recovery unit 85 recovers a phase of the channel distortion-compensated broadcasting signal. The trellis decoder 87 performs trellis decoding with respect to the broadcasting signal with phase distortion which is recovered at the phase recovery unit 85. The de-interleaver 88 performs de-interleaving with respect to the trellis decoded broadcasting signal in correspondence to interleaving performed at a transmitter. The reed-solomon demodulator 89 performs decoding with respect to the de-interleaved broadcasting signal in correspondence to reed-solomon encoding performed at the transmitter.

Figures 5, 6:
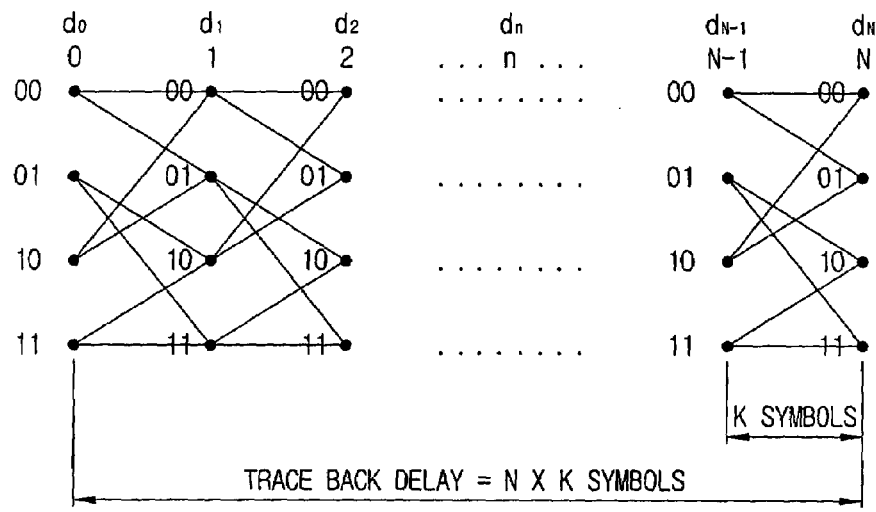
FIG. 5 is a view illustrating an output of trellis decoded data of a trellis decoder of FIG. 4.
FIG. 6 is a table listing a signal to noise ratio according to an output delay of trellis decoding of the trellis decoder of FIG. 4.

FIG. 5 shows one example of the trellis decoder 87 shown in FIG. 3. A whole decoding depth of the trellis decoder 87 has a state of $0, 1, 2, 3, \ldots, N$, and in a case of performing de-interleaving in a unit of K (K=natural number) symbol(s), a whole trace back delay has a symbol length of K×N. In other words, when the whole decoding depth of the trellis decoder 87 is in the state of $0, 1, 2, 3, \ldots, N$, a plurality of certain decoded data $d_0, d_1, \ldots, d_n$ (n≦natural number) that are randomly chosen from whole decoded data $d_0, d_1, \ldots, d_N$, are fed back to the channel equalizer 84. Accordingly, based on the certain decoded data fed back from the trellis decoder 87, the channel equalizer 84 performs channel equalization with respect to respective symbols of the broadcasting signal.

Figure 4:
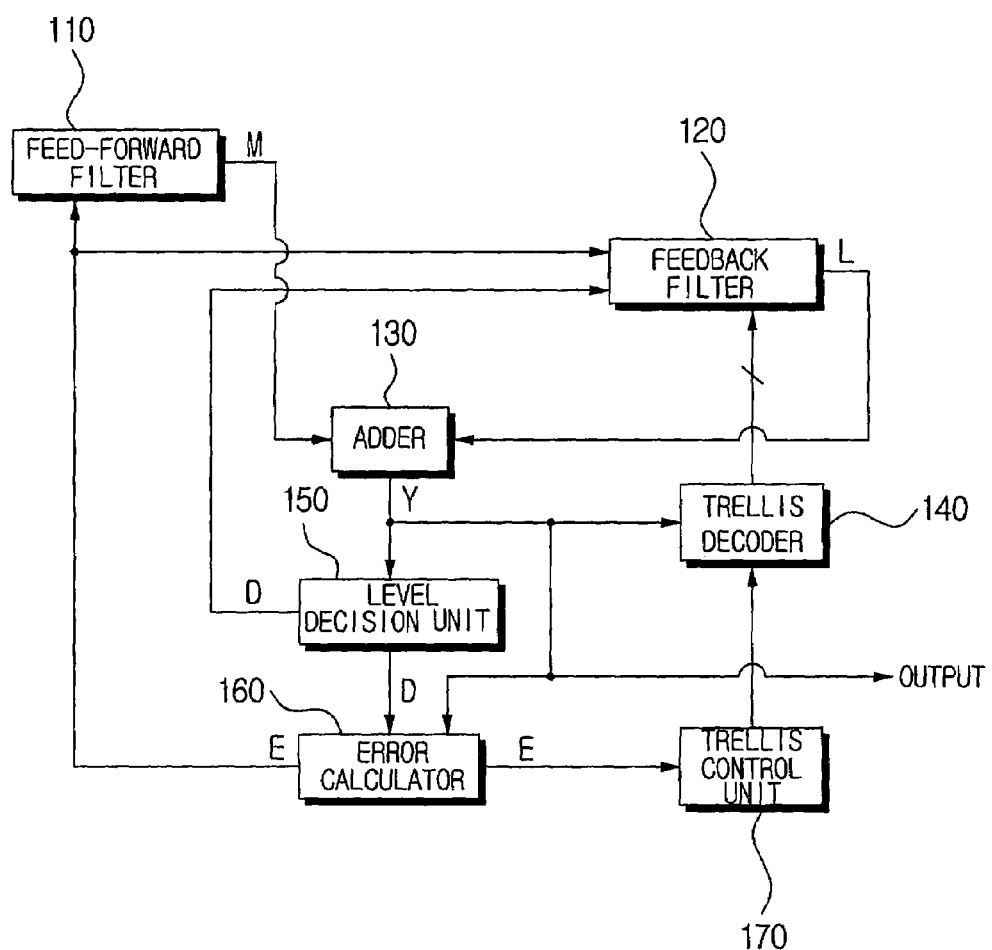
FIG. 4 is a block diagram of a channel equalizer adapted for an equalization performance improvement of the single carrier receiver shown in FIG. 3.

FIG. 4 is a block diagram of a channel equalizer adapted for use in the single carrier receivers, for example, the VSB receiver shown in FIG. 3, to improve an equalization performance. The channel equalizer of FIG. 4 is used as the channel equalizer 84, the phase recovery unit 85, and the trellis decoder 87 shown in FIG. 3.

As shown in FIG. 4, the channel equalizer includes a feed-forward filter 110, a feedback filter 120, an adder 130, a trellis decoder 140 (the trellis decoder 87 of FIG. 3), a level decision unit 150, an error calculator 160 and a trellis control unit 170.

The feed-forward filter 110 removes an influence of a pre-ghost with respect to the respective symbols of the broadcasting signal. The feedback filter 120 removes a post-ghost with respect to the respective symbols of the broadcasting signal. Here, the feed-forward filter 110 and the feedback filter 120 are constructed so as to sequentially buffer the input of the broadcasting signal in a unit of the symbol and then remove the pre- and post-ghosts from the symbols buffered at respective buffers (not shown). The feed-forward filter 110 and the feedback filter 120 of FIG. 4 have structures which are identical to the feed-forward filter 10 and the feedback filter 30 of FIG. 1, respectively.

The adder 130 adds a pre-ghost removed value M output from the feed-forward filter 110 with a post-ghost removed value L output from the feedback filter 120. The trellis decoder 140 performs the trellis decoding with a resultant value Y obtained at the adder 130.

The level decision unit 150 determines a level of the resultant value Y from the adder 130 to be a nearest one among predetermined levels. Accordingly, the level decision unit 150 provides the feedback filter 120 and the error calculator 160 with determined level data D. The level decision unit 150 may determine the levels in correspondence with the predetermined broadcasting signal, such as 4-level, 8-level, or 16-level.

The error calculator 160 calculates an error value E, which is the difference between the resultant value Y from the adder 130 and the determined level data D from the level decision unit 150.

The error calculator 160 provides the calculated error value E to the feed-forward filter 110, the feedback filter 120 and the trellis control unit 170. The feed-forward filter 110 and the feedback filter 120 update a tap coefficient based on the error value E provided by the error calculator 160.

Based on the error value E provided by the error calculator 160, the trellis control unit 170 controls an operation of the trellis decoder 140. More specifically, when the signal to noise ratio (SNR) corresponding to the error value E obtained at the error calculator 160 is equal to or more than a predetermined threshold, the trellis control unit 170 controls the trellis decoder 140 so that the certain decoded data $d_0, d_1, \ldots, d_n$ corresponding to certain decoding depth states which are randomly selected from the whole decoding depth states $0, 1, 2, \ldots, N$ are input to a plurality of corresponding filter taps of the feedback filter 120.

For example, FIG. 5 shows a situation where the decoded data $d_0, d_1 \ldots d_n$ output from the whole decoding depth states of $0, 1, 2, \ldots, n$ (n≦N, natural number). Corresponding to a trace back delay length, the decoded data $d_0, d_1, \ldots, d_n$ are input to corresponding filter taps of the feedback filter 120, respectively. Accordingly, the decoded data $d_0$ output from the decoding depth state '0' is input to a first filter tap of the feedback filter 120, and the decoded data $d_1$ output from the decoding depth state '1' is output in the unit of the K symbol, thus to the (1+K)th filter tap. The decoded data $d_n$ output from the decoding depth state 'n' is input to the 1+(n×K) th filter tap of the feedback filter 120.

With performing the trellis decoding on the resultant value Y, the trellis decoder 140 under a control of the trellis control unit 170 inputs the decoded data $d_0, d_1, \ldots, d_n$ that are output from the certain decoding depth states, into respectively corresponding filter taps. Accordingly, the feedback filter 120 removes the post-ghost with respect to respective the symbols based on the decoded data $d_0, d_1, \ldots, d_n$ input from the trellis decoder 140.

Accordingly, the feedback filter 120 performs the post-ghost removal filtering based on the determined level data fed back from the level decision unit 150, and performs the post-ghost removal of the respective symbols based on the decoded data $d_0, d_1, \ldots, d_n$ when the decoded data $d_0, d_1, \ldots, d_n$ are input from the trellis decoder 140.

As a result, error propagation of the feedback filter 120 due to erroneous level data determination of the level decision unit 150 can be avoided.

FIG. 6 is a table listing the signal to noise ratio (SNR) of an output signal of the trellis decoder 140 according to an output delay of the trellis decoding. The broadcasting signal used in the experiment was a Brazilian D channel.

As shown in FIG. 6, the Brazilian D channel has a greatest SNR when the decoding depth of the trellis decoder 140 is '0'. Accordingly, it is possible that the trellis decoded data $d_0$ be input from the trellis decoder 140 to the feedback filter 120. Accordingly, an equalization efficiency is greatly improved because the trellis decoded data $d_0$ is input from the trellis decoder 140 to the feedback filter 120 even when there is a robust ghost included in a front portion of the broadcasting signal in the Brazilian D channel.

Figure 7:
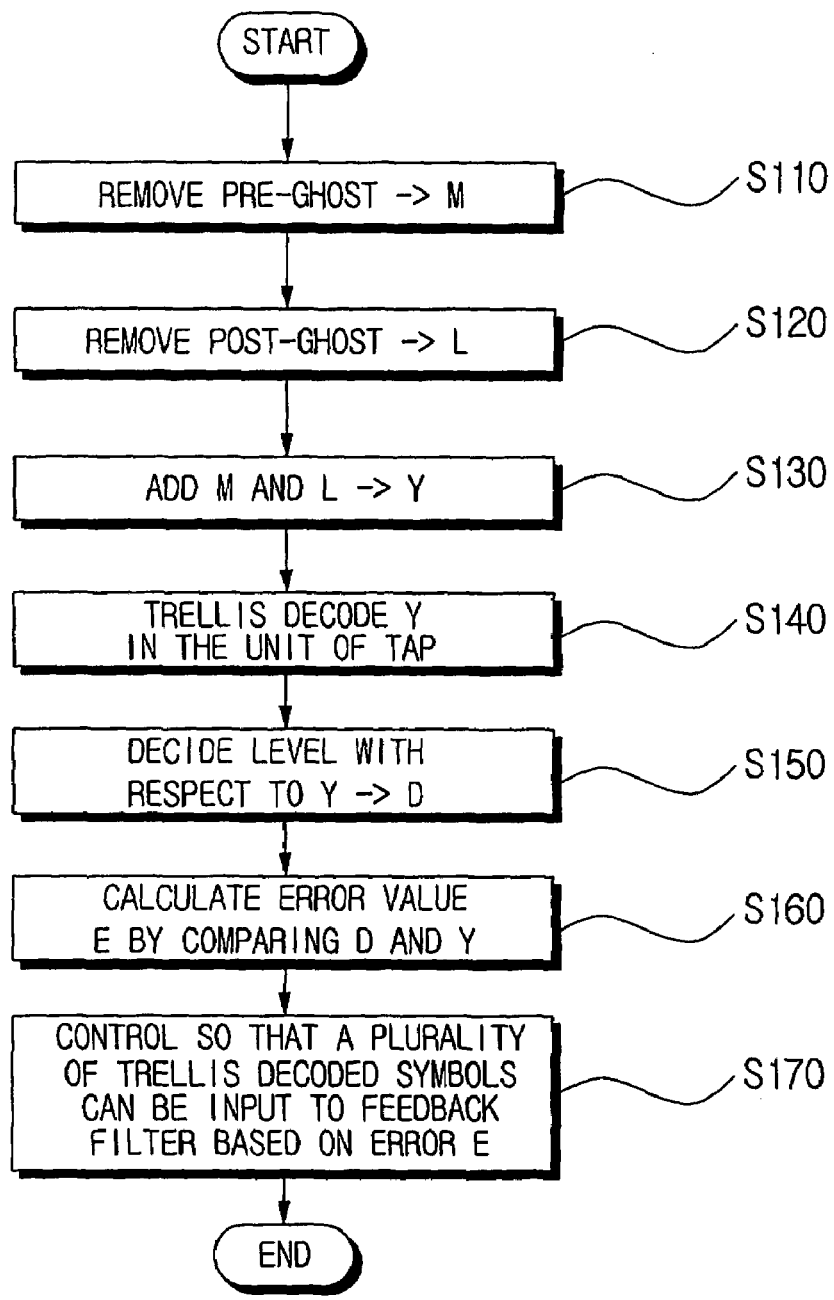
FIG. 7 is a flowchart illustrating a channel equalizing method the single carrier receiver shown in FIGS. 3 and 4.

FIG. 7 is a flowchart illustrating a channel equalizing method that uses the channel equalizer shown in FIG. 4 to improve a channel equalizing efficiency. Some parts of FIG. 7 that have already described above with reference to FIGS. 4 and 5 will be omitted below.

First, the feed-forward filter 110 removes the pre-ghost from the respective symbols of the broadcasting signal, thereby outputting a signal M in operation S110. The feedback filter 120 removes the post-ghost from the respective symbols of the broadcasting signal, thereby outputting a signal L in operation S120.

The adder 130 adds the signal M from which the pre-ghost is removed, and which is output from the feed-forward filter 110, with the signal L from which the post-ghost is moved, and which is output from the feedback filter 120, thereby outputting a sum signal (the resultant value) Y in operation S130. The trellis decoder 140 trellis-decodes the sum signal Y of the adder 130 in operation S140.

The level decision unit 150 determines the level of the sum signal Y of the adder 130 to be the nearest one among the predetermined levels in operation S150. Accordingly, the level decision unit 150 provides the signal D of the determined level to the feedback filter 120 and the error calculator 160. The error calculator 160 calculates the error value E, i.e., a difference between the sum signal Y of the adder 130 and the determined level data D of the level decision unit 150 according to a predetermined error update algorithm in operation S160. The error calculator 160 provides the calculated error value E to the feed-forward filter 110, the feedback filter 120 and the trellis control unit 170. The feed-forward filter 110 and the feedback filter 120 update coefficients based on the error value E provided by the error calculator 160.

Meanwhile, based on the error value E provide by the error calculator 160, the trellis control unit 170 in the operation S170 controls a time point when the trellis-decoded data of the trellis decoder 140 is input into the feedback filter 120. When the SNR corresponding to the error value E obtained by the error calculator 160 is equal to or more than the predetermined threshold, the trellis control unit 170 in the operation S170 controls the trellis decoder 140 to input the decoded data to the feedback filter 120.

Accordingly, the feedback filter 120, performing the post-ghost removal filtering based on the determined level data feed back from the level decision unit 150, performs the post-ghost removal of the respective symbols based on the decoded data received from the trellis decoder 140.

Accordingly, by preventing the error propagation at the feedback filter occurring due to the error of the level decision unit, the equalization performance of the channel equalizer is enhanced.

According to the present invention, even when the SNR corresponding to the error value obtained at the error calculator is equal to or more than the predetermined threshold, degradation of the equalization efficiency due to the erroneous level decision of the level decision unit is prevented by the feedback filter which performs filtering based on the decoded data input from the trellis decoder.

Although an embodiment of the present invention has been described, it will be understood by those skilled in the art that the present invention should not be limited to the described preferred embodiment, but various changes and modifications can be made within the spirit and scope of the present invention as defined by the appended claims and their equivalents.

What is claimed is:

1. A channel equalizer of a single carrier receiver receiving an input signal, comprising:
    a feed-forward filter removing a pre-ghost of respective symbols of the input signal;
    a feedback filter removing a post-ghost of the respective symbols of the input signal;
    an adder combining the pre-ghost removed symbol with the post-ghost removed symbol;
    a level decision unit determining a level of the symbols added at the adder with reference to predetermined level data, and feeding back the determined level to the feedback filter;
    a trellis decoder performing trellis decoding with respect to a sum of the symbols obtained at the adder;
    an error calculator calculating an error value between the symbols obtained at the adder and the level determined at the level decision unit; and
    a trellis control unit controlling the trellis decoder so that a plurality of decoded symbols output from the trellis decoder are input to the feedback filter based on the error value obtained at the error calculator.

2. The channel equalizer of claim 1, wherein the trellis control unit controls the trellis decoder so that the decoded symbols are input to the feedback filter when a signal to noise ratio corresponding to the error value is equal to or more than a predetermined threshold.

3. The channel equalizer of claim 1, wherein the trellis decoder comprises;
    a whole decoding depth as an N (N=natural number); and
    a whole length of a trace back delay as an N×K (K=natural number).

4. The channel equalizer of claim 3, wherein the trellis decoder inputs to the feedback filter the decoded symbols that are output from a plurality of decoding depth states of the whole decoding depth.

5. The channel equalizer of claim 4, wherein the decoded symbols output from the decoding depth states of an n (n≦N, N=natural number) is input to a 1+(n×K)th filter tap of the feedback filter, and the decoded symbols output from the decoding depth states are input to respectively corresponding filter taps of the feedback filter.

6. The channel equalizer of claim 1, wherein, with an input of the level determined at the level decision unit, the feedback filter removes the post-ghost from the respective symbols based on the decided level, and with another input of a decoded symbols from the trellis decoder, the feedback filter removes the post-ghost from the respective symbols based on the decoded symbols.

7. A channel equalizing method of a single carrier receiver receiving an input signal, comprising:
removing a pre-ghost from respective symbols of the input signal using a feed-forward filter;
removing a post-ghost from respective symbols of the input signal using a feedback filter;
combining the pre-ghost removed symbols with the post-ghost removed symbols;
performing a feedback operation of determining a sum of the symbols as a corresponding level with reference to predetermined level data, and inputting the determined level to the feedback filter;
computing an error between the sum of the symbols and the determined corresponding level based on a predetermined error updated algorithm;
performing a trellis decoding operation of performing trellis decoding of the symbols using a trellis decoder; and
controlling the trellis decoder to determine whether the decoded symbols output from the trellis decoder is input to the feedback filter based on the computed error.

8. The channel equalizing method of claim 7, wherein the controlling of the trellis decoder comprises:
inputting the decoded symbols from the trellis decoder into the feedback filter when a signal to noise ratio corresponding to the error value is equal to or more than a predetermined threshold.

9. The channel equalizing method of claim 7, wherein the trellis decoder in the trellis decoding operation comprises:
a whole decoding depth as N (N=natural number); and
a whole length of a trace back delay as an N×K (K=natural number).

10. The channel equalizing method of claim 9, wherein the trellis decoder inputs the decoded symbols output from a plurality of decoding depth states of the whole decoding depth into the feedback filter.

11. The channel equalizing method of claim 10, wherein the decoded symbols output from the decoding depth states of n, which is equal to or smaller than N, is input to a 1+(n×K)th filter tap of the feedback filter, and the decoded symbols output from the decoding depth states are input to respectively corresponding filter taps of the feedback filter.

12. The equalizing method of claim 10, wherein the feedback filter removes the post-ghost from the respective symbols based on the decided level, and based on an input of the decoded symbols from the trellis decoder, removes the post-ghost from the respective symbols based on the decoded symbols.

13. A single carrier receiver receiving an input signal, comprising:
a recovery unit recovering an original signal from the input signal;
a phase recovery unit recovering a phase distortion of the input signal;
a channel equalizer performing a channel equalization with respect to symbols of the phase-distortion recovered input signal using decoded symbols in a unit of trellis decoding depth, wherein the channel eciualizer comprises:
a feed-forward filter removing a pre-ghost of respective symbols of the input signal:
a feedback filter removing a post-ghost of the respective symbols of the input signal:
an adder adding the pre-ghost removed symbols with the post-ghost removed symbols:
a level decision unit determining a level of the symbols added at the adder with reference to predetermined level data, and feeding back the determined level to the feedback filter;
a trellis decoder performing a trellis decoding with respect to a sum of the symbols obtained at the adder;
an error calculator calculating an error value between the symbols obtained at the adder and the determined level determined at the level decision unit; and
a trellis control unit controlling the trellis decoder so that a plurality of decoded symbols output from the trellis decoder are input to the feedback filter based on the error value obtained at the error calculator;
a de-interleaver performing de-interleaving with respect to the channel-equalized input signal from the channel equalizer; and
a reed-solomon demodulator performing reed-solomon decoding with respect to the de-interleaved input signal.

14. The single carrier receiver of claim 13, wherein the recovery unit comprises:
a demodulator converting the input signal into a base bandwidth;
a distortion compensation unit recovering a distortion of at least one of a segment synchronization signal, a field synchronization signal, and a symbol timing of the input signal in the base bandwidth; and
a comb filter removing an NTSC (Natural Television System Committee) interference signal from the distortion-recovered input signal.

15. The single carrier receiver of claim 13, wherein the trellis decoder comprises:
a whole decoding depth as N (N=natural number); and
a whole length of a trace back delay as N×K (K=natural number).

16. The single carrier receiver of claim 15, wherein the trellis decoder inputs the decoded symbols output from a plurality of decoding depth states of the whole decoding depth into the feedback filter.

17. The single carrier receiver of claim 13, wherein the trellis control unit controls the trellis decoder to input the decoded symbols output from the trellis decoder into the feedback filter when a signal to noise ratio corresponding to the error is equal to or more than a predetermined threshold.

18. The single carrier receiver of claim 17, wherein the decoded symbols output from the decoding depth states of an n (n≦N, N=natural number ) is input to a 1+(n×K)th filter tap of the feedback filter, and the decoded symbols output from the decoding depth states are input to respectively corresponding filter taps of the feedback filter.

19. The single carrier receiver of claim 13, wherein, based on an input of the determined level determined at the level decision unit, the feedback filter removes the post-ghost from the respective symbols based on the determined level, and, based on another input of the decoded symbols from the trellis decoder, the feedback filter removes the post-ghost from the respective symbols based on the decoded symbols.

20. A single carrier receiver receiving an input signal, comprising:
a channel equalizer removing a pre-ghost and a post-ghost of respective symbols of the input signal, and trellis-decoding a sum of the pre- and post-ghosts removed symbols of the input signal based on predetermined level data and the sum of the pre- and post-ghosts removed symbols of the input signal, wherein the channel equalizer comprises:
- a level decision unit determining a level of the symbols based on the predetermined level data, and feeding back the determined level to the feedback filter,
- an error calculator calculating an error value between the determined level and the sum of the pre- and post-ghosts removed symbols of the input signal,
- a trellis decoder trellis-decoding the sum of the pre- and post-ghosts removed symbols of the input signal based on the error value of the error calculator, and
- a controller controlling the trellis decoder to transmit the decoded sum of the pre- and post-ghosts removed symbols of the input signal to the feedback filter.

21. The single carrier receiver of claim 20, wherein the channel equalizer comprises:
- a feedback filter removing the post-ghost of the respective symbols of the input signal; and
- a feed-forward filter removing the pre-ghost of respective symbols of the input signal.

22. The single carrier receiver of claim 20, wherein the level decision unit determines the level of the pre- and post-ghosts removed symbols based on the predetermined level data.

23. The single carrier receiver of claim 20, wherein the feedback filter outputs the post-ghost removed symbols based on the determined level.

24. The single carrier receiver of claim 20, wherein the feedback filter removes the post-ghost of the symbols of the input signal based on the decoded sum.

25. The single carrier receiver of claim 20, wherein the channel equalizer transmits the decoded sum of the pre- and post-ghosts removed symbols of the input signal to the feedback filter.

26. The single carrier receiver of claim 25, wherein the channel equalizer generates post-ghosts removed symbols of the input signal based on the error value.

27. The single carrier receiver of claim 25, wherein the channel equalizer generates the post-ghosts removed symbols of the input signal based on the decoded sum of the pre- and post-ghosts removed symbols of the input signal.

28. The single carrier receiver of claim 20, wherein the channel equalizer transmits the decoded symbols of the input signal to the feedback filter so that the feedback filter removes the post-ghost of the symbols of the input signal based on the decoded sum.

29. A method of performing a channel equalization with respect to symbols of an input signal in a single carrier receiver, the method comprising:
- removing a pre-ghost of respective symbols of the input signal using a feed-forward filter and outputting a signal M;
- removing a post-ghost of respective symbols of the input signal using a feedback filter and outputting a signal L:
- adding the signal M and the signal L and outputting a resultant sum signal Y;
- trellis-decoding, by a trellis decoder, the resultant sum signal Y to output a plurality of trellis-decoded symbols;
- determining a level of the resultant sum signal Y to be a nearest one among predetermined levels and providing a signal D of the determined level to the feedback filter and an error calculator;
- calculating an error value E as a difference between the resultant sum signal Y and the signal D of the determined level and outputting the error value E to the feed-forward filter, the feedback filter, and a trellis control unit, wherein, when a SNR corresponding to the error value E is equal to or greater than a predetermined threshold, the trellis decoder inputs the plurality of trellis-decoded symbols to the feedback filter.

30. The method of claim 29, further including, after the calculating of the error value E operation, updating coefficients, by the feed-forward filter and the feedback filter, based on the error value E.

31. A method of performing a channel equalization with respect to symbols of an input signal in a single carrier receiver wherein a pre-ghost of respective symbols of the input signal is removed by a feed-forward filter to output a signal M and a post-ghost of respective symbols of the input signal is removed by a feedback filter to output a signal L, a resultant sum signal Y is formed by summing signals M and L, and the resultant sum signal Y is trellis decoded to provide trellis-decoded symbols, the method comprising:
- determining a level of the resultant sum signal Y to be a nearest one among predetermined levels and outputting a signal D of the determined level; and
- calculating an error value E as a difference between the resultant sum signal Y and the signal D of the determined level and a SNR corresponding thereto, wherein, when the SNR corresponding to the error value E is equal to or greater than a predetermined threshold, the plurality of trellis-decoded symbols are input to the feedback filter to enhance post-ghost removal filtering.

* * * * *

UNITED STATES PATENT AND TRADEMARK OFFICE
CERTIFICATE OF CORRECTION

| | |
|---|---|
| PATENT NO. | : 7,218,673 B2 |
| APPLICATION NO. | : 10/625614 |
| DATED | : May 15, 2007 |
| INVENTOR(S) | : Yong-deok Chang et al. |

It is certified that error appears in the above-identified patent and that said Letters Patent is hereby corrected as shown below:

Column 8, Line 44, after "ratio" insert --(SNR)--.
Column 8, Line 47, change "comprises;" to --comprises:--.
Column 9, Line 58, change "eciualizer" to --equalizer--.
Column 9, Line 61, change "signal:" to --signal;--.
Column 9, Line 63, change "signal:" to --signal;--.
Column 9, Line 65, change "symbols:" to --symbols;--.
Column 10, Line 28, change "Natural" to --National--.
Column 12, Line 8, change "L:" to --L;--.

Signed and Sealed this

Eleventh Day of September, 2007

JON W. DUDAS
*Director of the United States Patent and Trademark Office*